United States Patent
Miyoshi et al.

(10) Patent No.: US 7,126,995 B2
(45) Date of Patent: Oct. 24, 2006

(54) DIGITAL SUBSCRIBER LINE COMMUNICATING SYSTEM

(75) Inventors: Seiji Miyoshi, Kawasaki (JP); Yutaka Awata, Yokohama (JP); Hiroyasu Murata, Kawasaki (JP); Nobukazu Koizumi, Kawasaki (JP); Takashi Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/918,177

(22) Filed: Aug. 13, 2004

(65) Prior Publication Data

US 2005/0018781 A1    Jan. 27, 2005

Related U.S. Application Data

(62) Division of application No. 09/318,445, filed on May 25, 1999, now Pat. No. 6,965,649.

(30) Foreign Application Priority Data

May 26, 1998   (JP)   ................. 10-144913

(51) Int. Cl.
*H04L 27/00*   (2006.01)
(52) U.S. Cl. .................................... 375/259
(58) Field of Classification Search ............. 375/229, 375/259, 285, 295, 296, 354, 371, 372, 377; 370/216, 229; 379/399.01, 32.04, 32.01, 379/1.01; 714/699, 701
See application file for complete search history.

(56) References Cited

U.S. PATENT DOCUMENTS

| | | | |
|---|---|---|---|
| 5,222,077 A | 6/1993 | Krishnan | |
| 5,375,147 A | 12/1994 | Awata et al. | |
| 5,440,347 A | 8/1995 | Guan | |
| 5,513,208 A | 4/1996 | Maeda | |
| 5,680,394 A | 10/1997 | Bingham et al. | |
| 5,774,450 A | 6/1998 | Harada et al. | |
| 5,966,373 A | 10/1999 | Stephenson et al. | |
| 5,982,784 A | 11/1999 | Bell | |
| 5,991,311 A | 11/1999 | Long et al. | |
| 6,009,122 A | 12/1999 | Chow | |
| 6,081,570 A * | 6/2000 | Ghuman et al. | 375/368 |
| 6,144,695 A | 11/2000 | Helms et al. | |
| 6,229,855 B1 | 5/2001 | Takatori et al. | |
| 6,307,889 B1 | 10/2001 | Chun | |
| 6,307,896 B1 * | 10/2001 | Gumm et al. | 375/316 |
| 6,477,184 B1 | 11/2002 | Ishikawa | |

FOREIGN PATENT DOCUMENTS

| | | |
|---|---|---|
| EP | 0 828 363 | 3/1998 |
| EP | 0 966 134 | 12/1999 |

(Continued)

OTHER PUBLICATIONS

European Search Report dated Mar. 14, 2005 for European Application No. 04027867.3.

(Continued)

*Primary Examiner*—Pankaj Kumar
(74) *Attorney, Agent, or Firm*—Katten Muchin Rosenman LLP

(57) ABSTRACT

A digital subscriber line communicating system having a central office and a remote terminal connected through a telephone line, the transmitting side having a sliding window transmitting unit for transmitting DMT symbols according to the sliding window trough the telephone line to the receiving side, and the receiving side having a sliding window receiving unit for receiving DMT symbols according to the sliding window from the transmitting side, the sliding window indicating the phase of cross-talk condition due to a TCM-ISDN transmission at the receiving side, whereby TCM cross-talk can be reduced without largely departing from the standard system.

4 Claims, 14 Drawing Sheets

FOREIGN PATENT DOCUMENTS

| | | |
|---|---|---|
| EP | 0 969 639 | 1/2000 |
| EP | 1 018 831 | 7/2000 |
| EP | 1 098 463 | 5/2001 |
| JP | 60-157350 | 8/1985 |
| JP | 63-92135 | 4/1988 |
| JP | 02-109436 | 4/1990 |
| JP | 8-251135 | 9/1996 |
| JP | 09/008770 | 1/1997 |
| JP | 10-65644 | 3/1998 |
| JP | 10-503893 | 4/1998 |
| WO | 95/34149 | 12/1995 |
| WO | WO 97/03506 | 1/1997 |
| WO | 98/52312 | 11/1998 |

OTHER PUBLICATIONS

European Search Report dated Mar. 14, 2005 for European Application No. 04027868.1.

European Search Report dated Mar. 14, 2005 for European Application No. 04027869.9.

European Search Report dated Mar. 14, 2005 for European Application No. 04027870.7.

European Search Report dated Mar. 9, 2005 for European Application No. 04027871.5.

European Search Report dated Mar. 9, 2005 for European Application No. 04027872.3.

European Search Report dated Mar. 9, 2005 for European Application No. 04027873.1.

Seiich Yamano. The Range of HDSLs and ADSLs in NTT's Local Networks. NTT Transmission Systems Laboratories. IEEE 1994 pp. 444.

David W. Lin. A Tutorial on Digital Subscriber Line Transceiver for ISDN. IEEE International Symposium on Circuits and Systems. pp. 839.

Zimmerman G A Ed et al. Achievable rates vs. operating characteristics of local loop transmission: HDSL, HDSL2, ADSL and VDSL. Signals, Systems, & Computers, Nov. 2, 1997. pp. 573-577, XP010280818.

Al Jackson. ADSL for High-Speed Broadband Data Service. Aerospace Conference, 1998 IEEE, pp. 451-465, XP0102086910.

XDSL, New Systems "SDMT" Prevents Crosstalk With ISDN—Talk With DMT Developer Nikkei Communications, 1997, p. 83.

Okamura et al. "ASDL System for Time Periodic Noise Environments" NEC Research and Development, Nippon Electric LTD., Tokyo JP.; vol. 40, No. 1, Jan. 1999, pp. 64-69; XP000869790: ISSN: 0547-051X.

International Telecommunication Union: "G.992.2 Asymetric Digital Subscriber Line (ADSL) Transceivers" ITU.T Recommendation Series G: Transmission Systems and Media, Digital Systems and Networks, Jun. 22, 1999 XP002200769: pp. 111-145.

Hiroshi Okado et al. A Study on ASDL system for TCM-ISDN Crosstalk. NEC Corporation, Mar. 1998.

\* cited by examiner

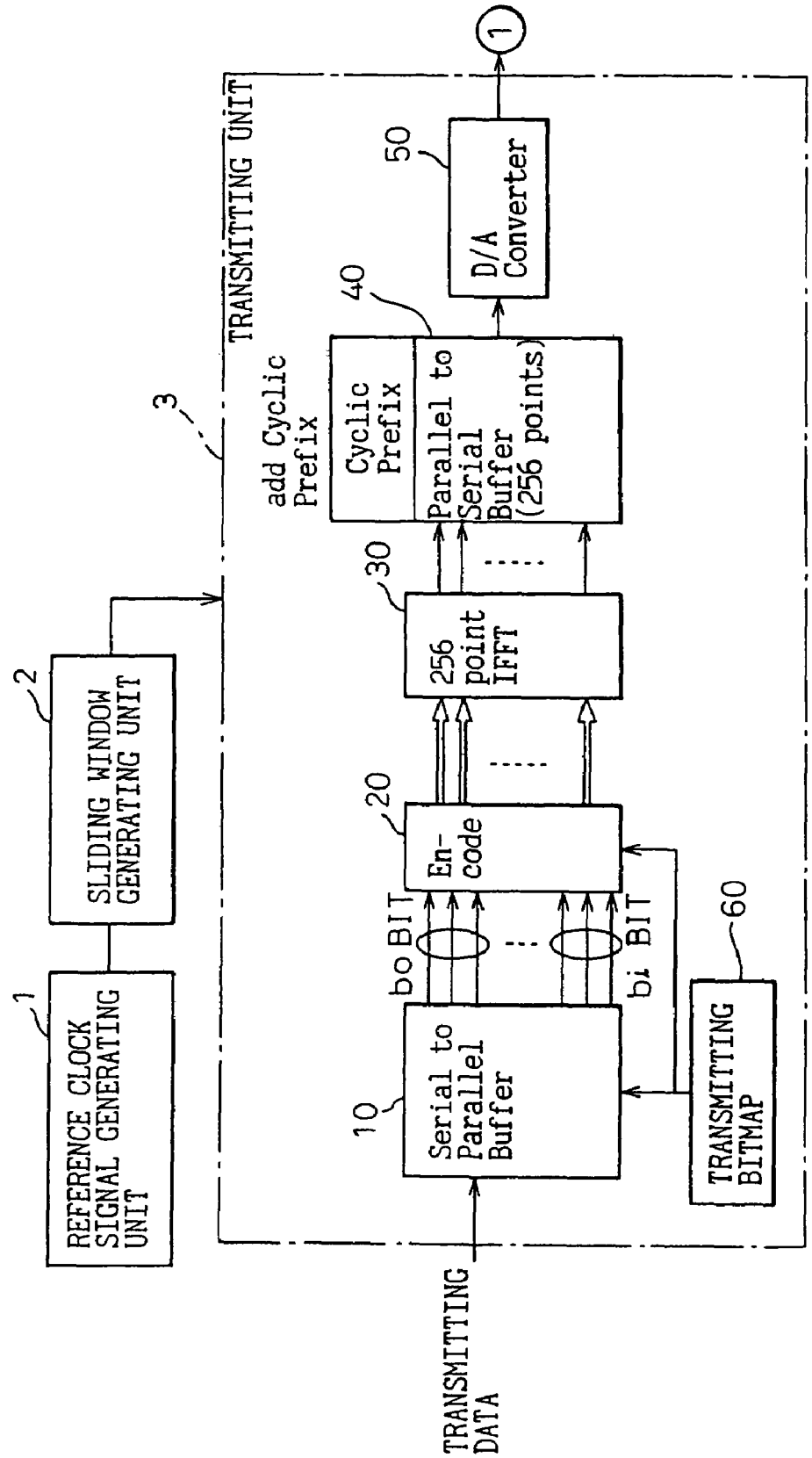

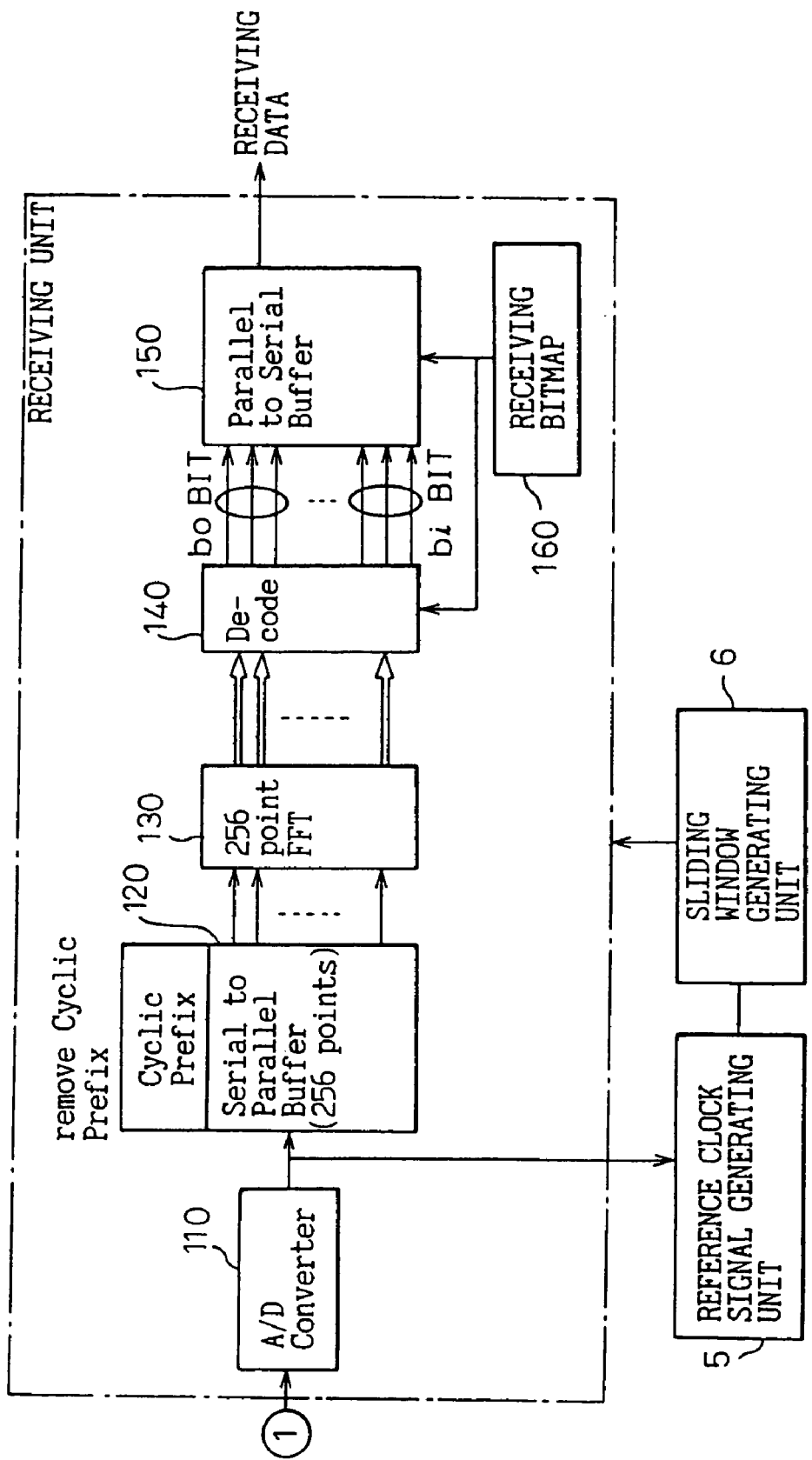

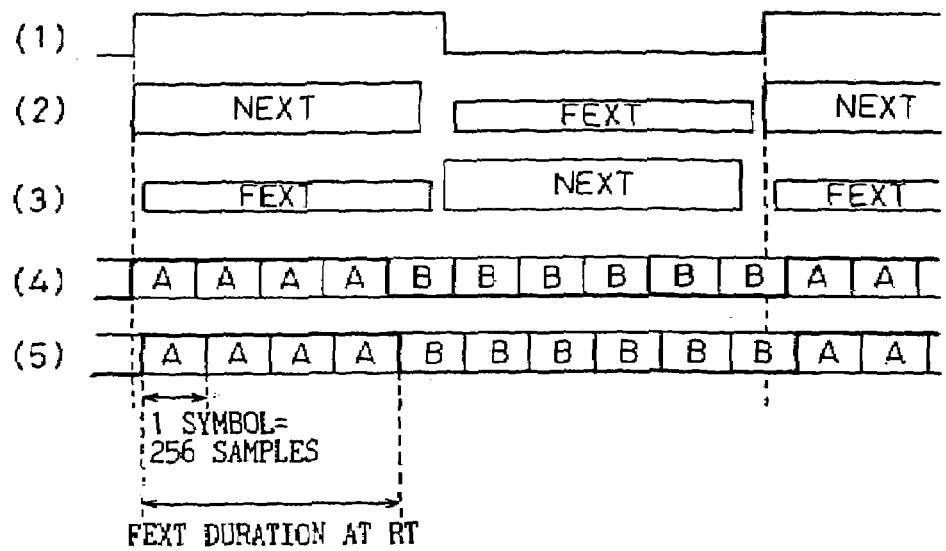
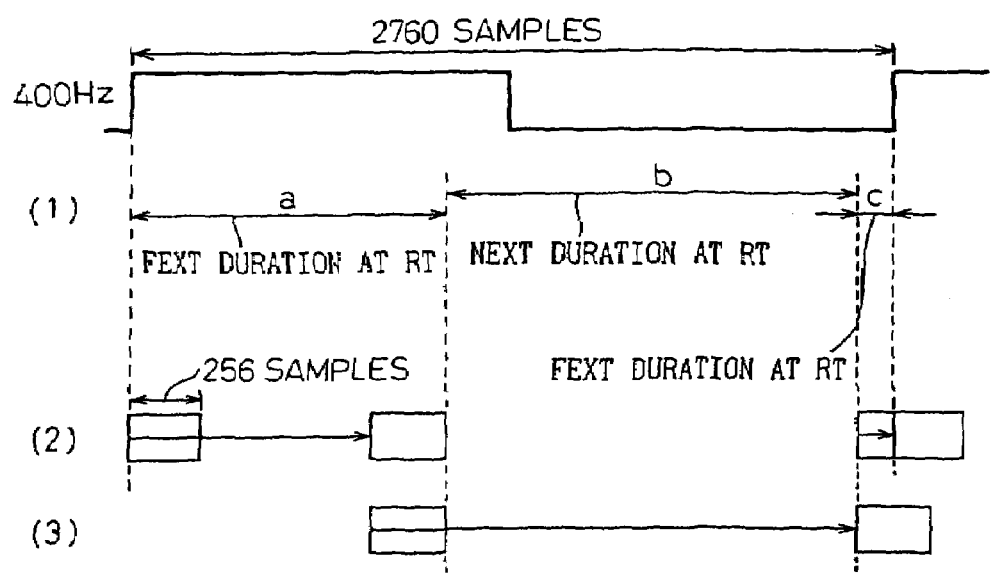

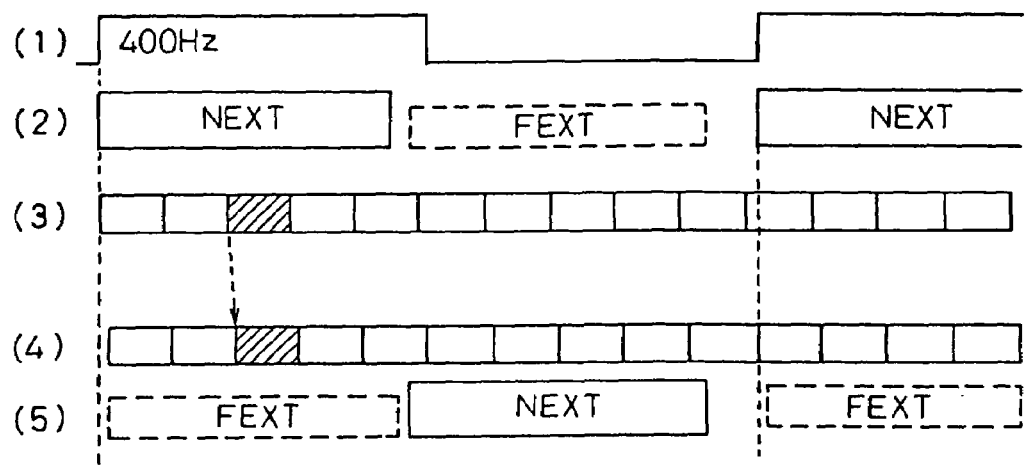
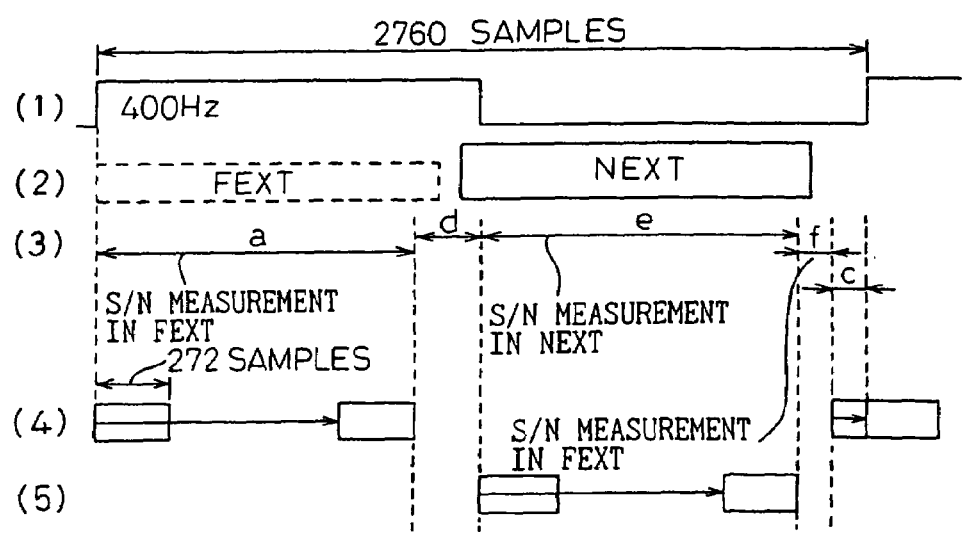

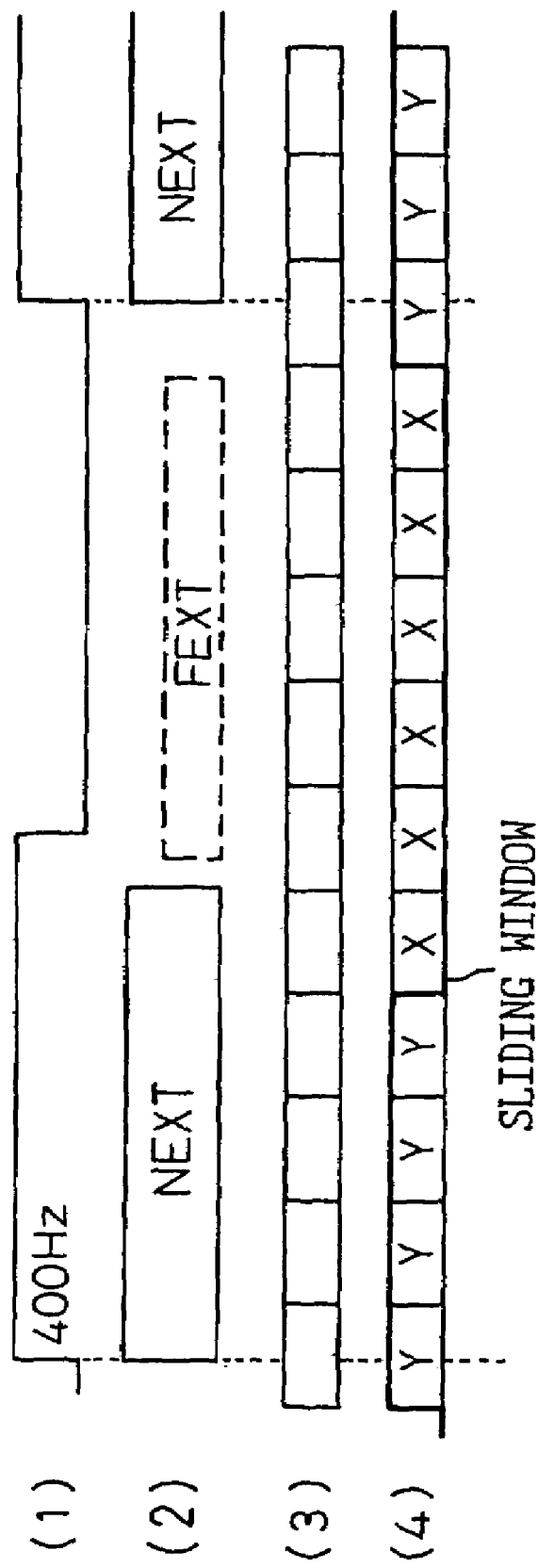

| CARRIER NO.i | NUMBER OF TRANSMITTED BITS bi |
|---|---|
| 0 | 0 |
| ⋮ | ⋮ |
| 48 | 5 |
| 49 | 7 |
| ⋮ | ⋮ |

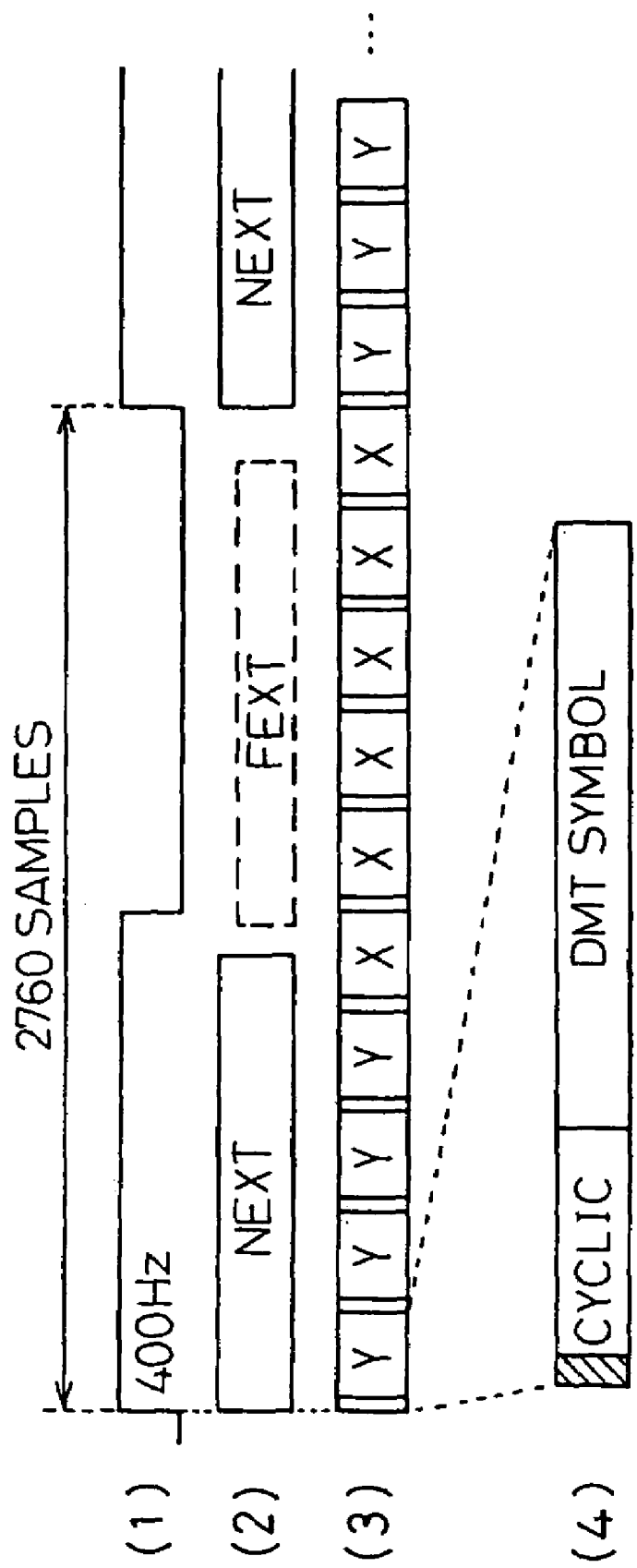

DIGITAL SUBSCRIBER LINE COMMUNICATING SYSTEM

CROSS REFERENCE TO RELATED APPLICATIONS

The present application is a divisional of U.S. patent application Ser. No. 09/318,445 filed on May 25, 1999 now U.S. Pat. No. 6,965,649 which claims priority from Japanese Patent Application No. 10-144913 filed May 26, 1998.

BACKGROUND OF THE INVENTION

1. Field of the Invention

The present invention relates to a digital subscriber line communicating system which utilizes an existing telephone line as a high speed data communication line. More particularly, it relates to an improvement of a modulation/demodulation system in a transmission apparatus used in the above-mentioned transmission system.

In recent years, multimedia services such as internet and so forth have expanded through the whole society including usual homes. Accompanied by such development, it has been strongly required to promptly provide an economical and reliable digital subscriber line communicating system for utilizing such services.

2. Description of the Related Art (1) An Explanation of an ADSL

As a technique to provide a subscriber line communicating system which utilizes the existing telephone line as a high speed data communication line, an XDSL (Digital Subscriber Line) is known. xDSL is a communicating system which utilizes a telephone line and a modulation/demodulation technique. xDSLs are generally classified into a symmetric type and an asymmetric type. In the symmetric type, upstream transmission speed from a subscriber home (hereinafter referred to as a remote terminal side) to an accommodating central office (hereinafter referred to as a central office side) is symmetric with the transmission speed from the central office side to the remote terminal side. In the asymmetric type, the transmission speed from the remote terminal side to the central office side is asymmetric with the transmission speed from the central office side to the remote terminal side.

In the asymmetric xDSLs, there is an Asymmetric DSL (ADSL) modem which is provided with the G.DMT standard having a downstream transmission speed of about 6 Mbits/sec. and the G.lite standard having a downstream transmission speed of about 1.5 Mbits/sec. Both of the G.DMT and (G.lite employ Discrete Multitone (DMT) modulation.

(2) An Explanation of the DMT Modulation

DMT modulation will be explained using G.lite as an example. This explanation and the associated drawing will describe only the downstream modulation/demodulation from the central office to the remote terminal. However, DMT modulation is also possible in the upstream modulation/demodulation.

Firstly, transmitting data is input into an ADSL transceiver unit (ATU) in the central office and a one-symbol time (¼ kHz) of the data is stored in a serial to parallel buffer. The stored data are divided into a plurality of groups. A predetermined number of transmission bits per carrier signal is previously allocated to each group in accordance with a transmitting bitmap which will be described later in detail. Each group is output to an encoder. In the encoder, each group of the input bit series is converted into a signal point expressed by a complex number for an orthogonal amplitude modulation and is output to IFFT. The IFFT performs the conversion from each of the signal points to transmit the signal sequences by an inverse fast Fourier transform. The signals from the IFFT are output to a parallel to serial buffer. Here the sixteen points of the outputs of the IFFT are added as a Cyclic Prefix to the head of each DMT symbol. The output of the parallel to serial buffer is supplied to a D/A converter in which the digital signal with a sampling frequency of 1.104 MHz is converted into an analog signal. The analog signal is transmitted through a metallic line to a remote terminal.

At the remote terminal side, the analog signal is converted into a digital signal with the sampling frequency of 1.104 MHz by an A/D converter. Each DMT symbol of the digital signal is stored in a serial to parallel buffer. In the buffer, the Cyclic Prefix is removed from the digital signal, and the remaining signal is output to an FFT. In the FFT, a fast Fourier transform is effected to generate or demodulate the signal points. The demodulated signal points are decoded by a decoder in accordance with a receiving bitmap having the same values as those in the transmitting bitmap. The decoded data are stored in a parallel to serial buffer as receiving data of bit-sequences.

(3) A Detailed Explanation of the Bitmap

The bitmap described in the explanation of the DMT will be explained in detail with reference to FIGS. 13A and 13B.

The apparatus at the central office side and the apparatus at the remote terminal side both measure the ratio of the receiving signal to noise (hereinafter referred to as S/N) during a training period prior to communication to determine the number of bits to be transmitted by each modulating carrier. As shown in FIGS. 13A and 13B, for a carrier signal with a larger S/N, a larger number of bits to be transmitted are allocated; and for a carrier signal with a smaller S/N, a smaller number of bits to be transmitted are allocated.

By the above allocation, the receiving side measures the S/N to prepare the bitmap which indicates the numbers of bits to be transmitted corresponding to the carrier numbers.

The receiving side informs this bitmap to the transmitting side during a training period so that both the transmitting side and the receiving side can perform the modulation/demodulation with the use of the same bitmap during normal data communication.

(4) Countermeasure Against Cross-Talk From The Time Compression Modulation ISDN Transmission (hereinafter referred to as TCM ISDN Transmission)

When there is a cross-talk due to the TCM ISDN Transmission, in the prior art, two different bitmaps are used in the ADSL modem in the transmitting side or in the receiving side so as to improve the transmission characteristic. This method of using the two bitmaps will be explained with reference to FIG. 14.

In the TCM ISDN transmission, the central office side transmits downstream data during a prior half of one cycle of a reference clock signal of 400 Hz shown in (1) of FIG. 14, in synchronization with the reference clock signal of 400

Hz; and the remote terminal side receives the downstream data and then transmits upstream data. Therefore, the ADSL modem in the central office is influenced by a Near End Cross-Talk (hereinafter referred to as NEXT) from the ISDN during the prior half of the one cycle of 400 Hz, and is influenced by a Far End Cross-Talk (hereinafter referred to as FEXT) from the upstream data of the remote terminal side ISDN.

Contrary to the central office, the ADSL modem in the remote terminal is influenced by a FEXT during a prior half of one cycle of the reference clock signal of 400 Hz, and is influenced by a NEXT during a latter half of the cycle.

If the metallic cable between the central office and the remote terminal is long, the S/N of the receiving signal to the NEXT is made smaller, and in some cases, the NEXT may be greater than the receiving signal.

In these cases, since the influence of the FEXT is not so large, in the prior art, two bitmaps are provided. One is a bitmap (DMT symbol X) for receiving signals during the NEXT period at the remote terminal. The other is a bitmap (DMT symbol Y) for receiving signals during the FEXT period at the remote terminal. During the NEXT period, in the prior art, the number of bits to be transmitted is made small so as to improve the resistance of the signals against the S/N. During the FEXT period, in the prior art, the number of bits to be transmitted is made large so as to increase the transmission capacity.

On the other hand, the time interval of one DMT symbol is usually 246 μs with a Cyclic Prefix of 16 points. Contrary to this, in the prior art, in order to conform the one DMT symbol with the TCM Cross-talk period of 400 Hz, the time interval of one DMT symbol is made to be 250 μs with a Cyclic Prefix of 20 points so that one period of the TCM Cross-talk is made to coincide with the time period of ten DMT symbols, whereby the synchronization with the TCM Cross-talk is established.

The above-mentioned prior art method of employing the two bitmaps, however, is largely different from the standard system in which only a single bitmap is employed. If two bitmaps are employed, the sequence of informing the bitmaps obtained from the S/N during a training period from the receiving side to the transmitting side must be modified, and in addition, the informing period is doubled so that the training period is increased.

In the apparatus of the central office or the remote terminal, the memory capacity must be increased in order to store the bitmaps, so that a cost problem occurs.

Further, to change the length of the Cyclic Prefix is largely different from the specification of the standard system so that the above-mentioned countermeasure against the TCM cross-talk cannot be performed in the hardware of the apparatus employing the standard system.

SUMMARY OF THE INVENTION

An object of the present invention is to provide a digital subscriber line transmission system capable of performing a countermeasure against TCM cross-talk, without largely departing from the standard system but by modifying only a part of the hardware under the standard system.

Another object of the present invention is to provide a digital subscriber line transmission system which can communicate at a most suitable transmission speed, regardless of whether or not there is cross-talk.

To attain the above objects, there is provided, according to the present invention, a digital subscriber line communicating system for communicating between a transmitting side and a receiving side through a communication line, comprising: a sliding window generating unit for generating a sliding window based on a timing signal representing a periodical noise duration; and a sliding window transmitting unit for transmitting modulated symbol according to the sliding window through the communication line to the receiving side.

The periodical noise duration is caused with a cross-talk noise on the communication line from an another transmission system using time compression modulation.

Both the sliding window generating unit and the sliding window transmitting unit are located in the transmitting side.

The sliding window is generated in such a way that inside modulated symbol of the sliding window is received by the receiving side when the receiving side is in a far end cross-talk duration.

According to an aspect of the present invention, the transmission side is a central office and the receiving side is a remote terminal. In this aspect, the central office comprises: a timing signal generating unit for generating the timing signal synchronized with the transmission system which interferes the central office and the remote terminal. The sliding window generating unit is operatively connected to the timing signal generating unit, and the sliding window is a downstream sliding window indicating the phase of noise condition of the remote terminal. Also, the sliding window transmitting unit transmits modulated symbols according to the downstream sliding window through the communication line to the remote terminal. Further, the remote terminal comprises: a sliding window receiving unit for receiving modulated symbols according to the downstream sliding window from the central office. The downstream sliding window indicates cross-talk durations due to the TCM ISDN transmission at the remote terminal.

The downstream sliding window is generated in such a way that inside symbol of the downstream sliding window is received by the remote terminal in a first cross-talk duration determined with a far end cross-talk duration at the remote terminal.

The first cross-talk duration is within a prior half of each cycle of the timing signal, and a second cross-talk determined with a near end cross-talk duration at the remote terminal, is within a latter half of each cycle of the timing signal, Inside of the downstream sliding window is formed within the first cross-talk duration.

During timing recover training between the central office and the remote terminal, inside symbol of the downstream sliding window is formed by a first kind of signal, and outside symbol of the downstream sliding window is formed by a second kind of signal, the first kind of signal and the second kind of signal being obtained by modulating a carrier signal but being different in phase by a predetermined angle.

When the first modulated symbol is synchronized with the head of one cycle of the timing signal, the central office comprises a duration discriminating unit for discriminating whether N-th modulated symbol belongs to inside or outside of the downstream sliding window.

The central office includes a transceiver comprising the timing signal generating unit and the sliding window generating unit.

According to another aspect of the present invention, the transmission side is a remote terminal and the receiving side is a central office. In this aspect, the remote terminal comprises: a timing signal receiving unit for receiving a timing phase via received modulated symbol according to a downstream sliding window from the central office, the timing signal being synchronized with a transmission system which interferes the central office and the remote terminal. In this aspect also, the sliding window generating-unit is operatively connected to the timing signal receiving unit, and the sliding window is an upstream sliding window indicating the phase of noise condition of the central office; and a sliding window transmitting unit for transmits modulated symbols according to the upstream sliding window through the communication line to the central office. The upstream sliding window indicates a cross-talk duration due to the TCM ISDN transmission at the central office. The upstream sliding window is generated in such a way that an inside symbol of the upstream sliding window is received by the central office in a third cross-talk duration determined with a far end cross-talk duration at the central office. In an embodiment, a fourth cross-talk duration determined with a near end cross-talk duration at the central office is within a prior half of each cycle of the timing signal, and the third cross-talk duration is within a latter half of each of the timing signal, and inside of the upstream sliding window is formed within the third cross-talk duration. When the first modulated symbol is synchronized with the head of one cycle of the timing signal, the remote terminal comprises a duration discriminating unit for discriminating whether N-th modulated symbol belongs to inside or outside of the upstream sliding window.

During training between the transmitting side and the receiving side, a training sequence switching symbol is transmitted from the transmitting side in such a way that the receiving side receives the head of the training sequence switching symbol during a far end cross-talk duration.

The number of bits to be transmitted per a carrier signal corresponds to a signal to noise ratio for the carrier signal, only the modulated symbols received completely inside of a near end cross-talk duration at the receiving side being used to measure the NEXT duration S/N, and only the inside modulated symbols of the sliding window at the receiving side being used to measure the FEXT duration S/N.

The digital subscriber line communicating system further comprises a sliding window bitmap transmission system for transmitting data symbols only inside of the sliding window with transmitting capacity determined by the S/N measurement in the inside of the sliding window at the receiving side.

The digital subscriber line communicating system further comprises a standard transmission system, wherein, according to the standard transmission system, data symbols are transmitted in both inside and outside of the sliding window with transmitting capacity determined by the S/N measurement in NEXT duration at the receiving side; and wherein the system having the larger transmitting capacity is selected to perform the communication.

The digital subscriber line communicating system comprises modified sliding window bitmap transmission system for transmitting data symbols in both inside and outside of the sliding window, and the inside data symbols are transmitted with transmitting capacity determined by the S/N measurement in the inside of the sliding window and the outside data symbols are transmitted with transmitting capacity determined by the S/N measurement in the NEXT duration at the receiving side.

According to one of the sliding window bitmap transmission system, at least a pilot tone used for synchronization of timing is transmitted outside of the sliding window.

According to one of the sliding window bitmap transmission system and the modified sliding window bitmap transmission system, a first predetermined number of super frames, each of which is composed of second predetermined number of modulated symbols and a synchronizing symbol, constitute a single unit, the single unit being synchronized with an integer multiple of one cycle duration of the timing signal, and one of the synchronizing symbols in the single unit, i.e., an inverse synchronizing symbol, is made different from other the synchronizing symbol in order to maintain the single unit to be synchronized between the central office and the remote terminal, and the inverse synchronizing symbol in N-th super frame of the super frames is received in the FEXT duration at the receiving side.

In an embodiment, the N-th super frame is 4-th super frame for downstream and first super frame for upstream, and the first predetermined number of super frames is 5, the second predetermined number of modulated symbols is 68.

According to further aspect of the present invention, there is provided a transceiver in a central office connected through a communication line to a remote terminal, the transceiver comprising: a timing signal generating unit for generating the timing signal representing a periodical noise duration; a sliding window generating unit, operatively connected to the timing signal generating unit, for generating a downstream sliding window indicating the phase of noise condition of the remote terminal; and a sliding window transmitting unit for transmitting modulated symbols according to the downstream sliding window through the communication line to the remote terminal.

The periodical noise duration is caused with a cross-talk noise on the communication line from an another transmission system using time compression modulation.

The downstream sliding window is generated in such a way that an inside symbol of the downstream sliding window is received by the remote terminal in a far end cross-talk duration at the remote terminal i.e., R-FEXT duration.

The first cross-talk duration is within a prior half of each cycle of the timing signal, and a second cross-talk duration determined with a near end cross-talk duration at the remote terminal is within a latter half of each cycle of the timing signal, inside of the downstream sliding window being formed within the first cross-talk duration.

During timing recover training between the central office and the remote terminal, inside symbol of the downstream sliding window is formed by a first kind of signal, and outside symbol of the downstream sliding window is formed by a second kind of signal, the first kind of signal and the second kind of signal being obtained by modulating a carrier signal but being different in phase by a predetermined angle.

When the first modulated symbol is synchronized with the head of one cycle of the timing signal, the central office comprises a duration discriminating unit for discriminating whether N-th modulated symbol belongs to inside or outside of the downstream sliding window.

According to still further aspect of the present invention, there is provided a transceiver in a remote terminal connected through a communication line to a central office, the transceiver comprising: a timing signal receiving unit for receiving a timing phase via received modulated symbol according to a downstream sliding window from the central office, the timing signal being synchronized with a transmission system using time compression modulation which interferes the central office and the remote terminal; a sliding window generating unit, operatively connected to the timing signal receiving unit, for generating an upstream sliding window indicating the phase of noise condition of the central office; and a sliding window transmitting unit for transmitting modulated symbols according to the upstream sliding window through the communication line to the central office; the upstream sliding window indicating cross-talk duration due to the TCM ISDN transmission at the central office.

The upstream sliding window is generated in such a way that inside symbol of the upstream sliding window is received by the central office in a far end cross-talk duration at the central office i.e., C-FEXT duration.

A near end cross-talk duration at the central office, i.e., C-NEXT duration, is within a prior half of each cycle of the timing signal, and the third cross-talk duration is within a latter half of each of the timing signal, inside of the upstream sliding window being formed within the third cross-talk duration.

When the first modulated symbol is synchronized with the head of one cycle of the timing signal, the remote terminal comprises a duration discriminating unit for discriminating whether N-th modulated symbol belongs to inside or outside of the upstream sliding window.

BRIEF DESCRIPTION OF THE DRAWINGS

The above objects and features of the present invention will be more apparent from the following description of the preferred embodiments with reference to the accompanying drawings, wherein:

FIG. 1A is a block diagram showing a central office according to an embodiment of the present invention;

FIG. 1B is a block diagram showing a remote terminal according to an embodiment of the present invention;

FIG. 2, is a diagram showing a method for transmitting synchronization signals according to an embodiment of the present invention;

FIG. 3 is a diagram showing how to define noise durations during an initial training period according to an embodiment of the present invention;

FIG. 4 is a timing chart of transmitting a sequence switching symbol according to an embodiment of the present invention;

FIG. 5 is a diagram showing how to define noise durations in receiving symbols during measuring an S/N, according to an embodiment of the present invention;

FIG. 12 is a diagram showing the SWB method when two bitmaps are employed;

FIG. 14 is a diagram showing a prior art; and

DETAILED DESCRIPTION OF THE PREFERRED EMBODIMENTS

Figure 6:
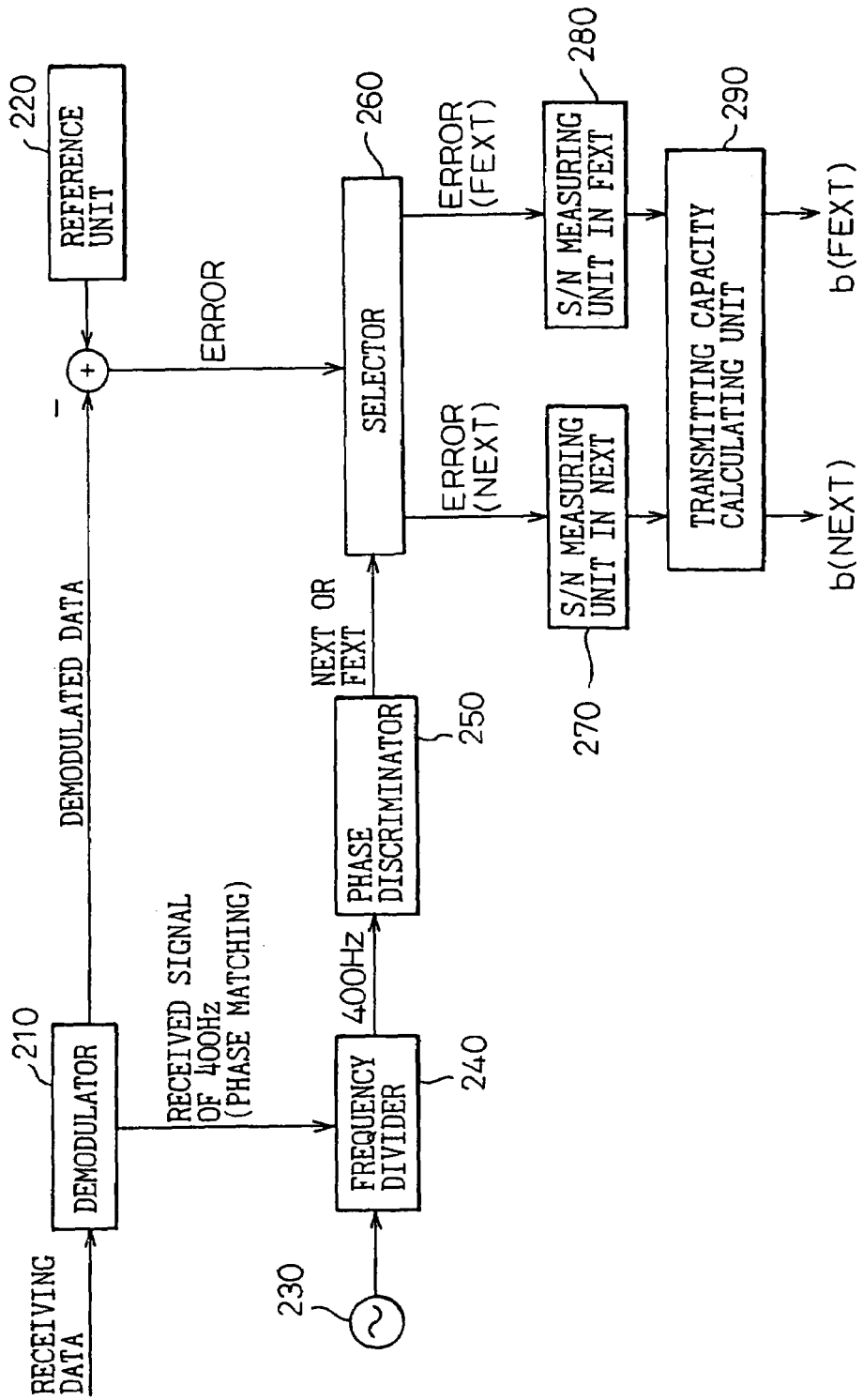
FIG. 6 is a block diagram of an embodiment for measuring the S/N in each of the NEXT or FEXT duration, according to an embodiment of the present invention.

The embodiments of the present invention will be described in the following with reference to the drawings.

FIG. 1A is a block diagram showing functional blocks of a central office according to an embodiment of the present invention; and FIG. 1B is a block diagram showing functional blocks of a remote terminal according to an embodiment of the present invention.

As shown in FIG. 1A, the central office includes a reference clock signal generating unit 1, a sliding window generating unit 2, and a sliding window transmitting unit 3. The reference signal generating unit 1 generates a reference clock signal having a frequency of, for example, 400 Hz, synchronized with a TCM ISDN transmission which interferes the central office and the remote terminal. The reference clock signal may be generated based on an external signal or within an internal signal generated by a crystal oscillator as an example.

The sliding window generating unit 2 generates a downstream sliding window from the generated reference clock signal. The downstream sliding window discriminates whether the transmitting DMT symbols are received in a far end cross-talk duration or in the other duration at the remote terminal.

The sliding window transmitting unit 3 transmits the DMT symbols according to the downstream sliding window to the remote terminal.

As shown in FIG. 1B, the remote terminal includes a sliding window receiving unit 4, a reference clock signal generating unit 5, and a sliding window generating unit 6.

The sliding window receiving unit 4 receives the DMT symbols according to the downstream sliding window from the central office.

The reference clock signal generating unit 5 generates a reference clock signal based on the reference clock signal generated by the reference clock signal generating unit 1 in the central office, and transmitted from the central office to the remote terminal.

The sliding window generating unit 6 generates an upstream sliding window from the generated reference clock signal by the reference clock signal generating unit 5. The generated downstream sliding window discriminates whether the received DMT symbols are received in a far end cross-talk duration or other duration at the remote terminal.

The reference clock signal in the central office or in the remote terminal may be generally referred to as a timing signal which is synchronized with the transmission system which interferes the central office and the remote terminal.

The DMT modulation will be explained using the G.lite as an example, with reference to FIGS. 1A and 1B. This explanation and the associated drawing will describe only the downstream modulation/demodulation from the central office to the remote terminal. However, the DMT modulation is also possible in the upstream modulation/demodulation.

Firstly, transmitting data is input into an ADSL transceiver unit (ATU) in the central office and a one-symbol time (¼ kHz) of the data is stored in a serial to parallel buffer 10. The stored data are divided into a plurality of groups. A predetermined number of transmission bits b0, . . . , or bi per a carrier signal is previously allocated to each group in accordance with a transmitting bitmap 60 which will be described later in detail. Each group is output to an encoder 20. In the encoder 20, each group of the input bit series is converted into a signal point expressed by a complex number for an orthogonal amplitude modulation and is output to IFFT 30. The IFFT 30 performs the conversion from each of the signal points to transmit signal sequence by an inverse fast Fourier transform. The signals from the IFFT 30 are output to a parallel to serial buffer 40. Here the sixteen tail points 240–255 of the outputs of the IFFT 30 are added as a Cyclic Prefix to the head of each DMT symbol. The output of the parallel to serial buffer 40 is supplied to a D/A converter 50 in which the digital signal with a sampling frequency of 1.104 Mhz is converted into an analog signal. The analog signal is transmitted through a metallic line 100 to a remote terminal.

At the remote terminal side, the analog signal is convened into a digital signal with the sampling frequency of 1.104 MHz by an A/D converter 110. Each DMT symbol of the digital signal is stored in a serial to parallel buffer 120. In the buffer 120, the Cyclic Prefix is removed from the digital signal, and the remaining signal is output to an FFT 130. In the FFT 130, a fast Fourier transform is effected to generate or demodulate the signal points. The demodulated signal points are decoded by a decoder 140 in accordance with a receiving bitmap 160 having the same values as those in the transmitting bitmap 60. The decoded data are stored in a parallel to serial buffer 150 as receiving data of bit-sequences b0, . . . bi.

FIG. 2 is a diagram showing a method for transmitting synchronization signals according to an embodiment of the present invention. In FIG. 2, (1) represents a reference clock signal for transmitting a Time Compression Modulation (TCM) signal having a frequency of 400 Hz between the central office to the remote terminal; (2) represents NEXT durations, i.e., C-NEXT durations and FEXT durations, i.e., C-FEXT durations at the central office which are synchronized with the reference clock signal (1) of 400 Hz; (3) represents FEXT durations, i.e., R-FEXT durations and NEXT durations, i.e., R-NEXT durations at the remote terminal which are synchronized with the reference clock signal (1) of 400 Hz; (4) represents symbols A and B transmitted from the central office to the remote terminal during an initial training; and (5) represents symbols A and B received by the remote terminal. The time difference between (4) and (5) is the propagation delay. Each of the symbols A and B has a duration of 256 samples. The symbols A and B are used to inform the NEXT duration and the FEXT duration from the central office to the remote terminal.

Figure 15:
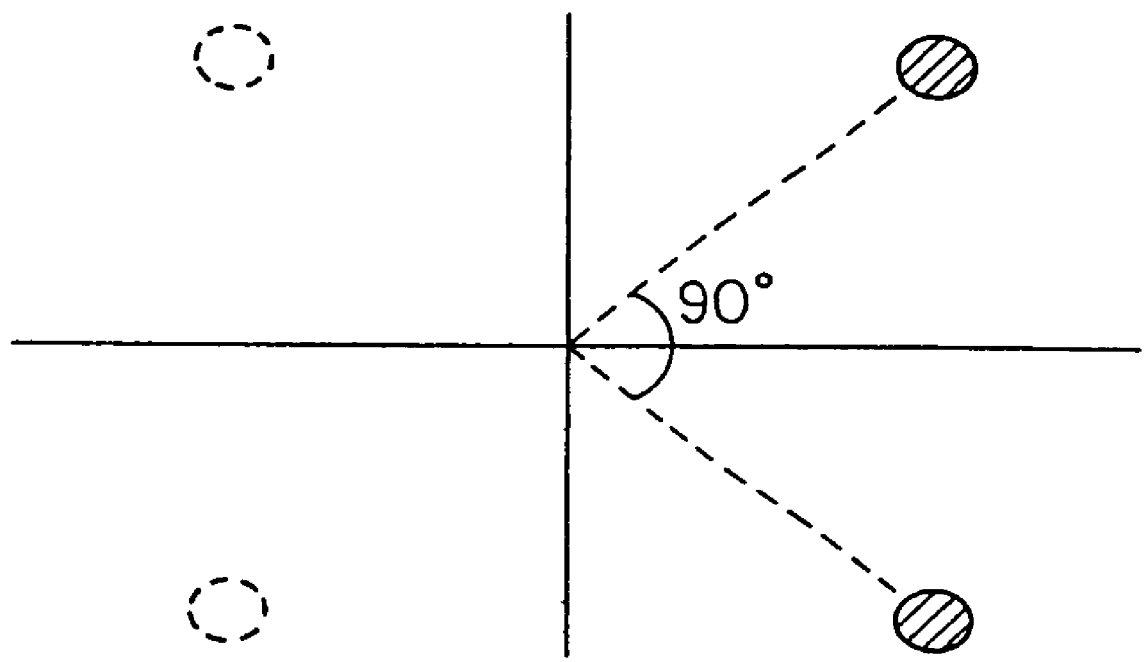
FIG. 15 is a diagram showing a transmitting pattern of each DMT symbol to inform the phase of the reference clock during timing recovery training sequence.

The symbols A and B are signals obtained by selecting a carrier having a relatively low frequency at which TCM cross-talk is small; modulating the selected carrier by the 4-value QAM as an example to obtain 4 signal points; and selecting two signal points A and B from the 4 signal points. The phases of the two signal points A and B are different by 90° to each other. The selected signal points A and B are shown in FIG. 15, as an example. The two signal points are converted by the IFFT 30 from the frequency domain to the time domain.

At the remote terminal, it is impossible to discriminate each boundary of DMT symbols output from the IFFT 30 in the central office. Therefore, it is impossible to coincide an FFT interval with a DMT symbol interval, so that signal points after modulation do not appear in correct phases or quadrants. However, by employing the two symbols A and B having phases different by 90° to each other, the modulated two symbols also have phases different by 90° to each other so that, even when there is an error in phase of the modulated signal points, the remote terminal can discriminate its NEXT duration, i.e., R-NEXT duration from its FEXT duration, i.e., R-FEXT duration.

FIG. 3 shows how to define the R-NEXT duration and the R-FEXT duration when a signal having a frequency of 400 Hz is transmitted during an initial training.

At the central office, once an ADSL modem detects the phase of the reference clock signal having the frequency of 400 Hz, a DMT symbol counter for counting each sample and a counter for discriminating the NEXT duration and the FEXT duration at the central office, i.e., the C-NEXT duration and the C-FEXT duration, are started, whereby it becomes possible to discriminate whether a received DMT symbol belongs to the C-NEXT duration or the C-FEXT duration without generating the reference clock signal from the received DMT symbols.

In FIG. 3, (1) shows counter values "a", "b", and "c", The counter value "a" represents the FEXT duration at the remote terminal; the counter value "b" represents the NEXT duration at the remote terminal; and the counter value "c" represents the remaining period obtained by subtracting (a+b) from one cycle period of the reference clock signal. These values are determined by taking a round trip delay generated by a propagation delay in the TCM ISDN transmission, (2) in FIG. 3 shows the case when all of the received DMT symbols are included in the R-FEXT duration at the remote terminal; and (3) in FIG. 3 shows the case when a part of the received DMT symbols are included in the R-NEXT duration at the remote terminal.

When the first DMT symbol is synchronized with the head of one cycle of the reference clock signal of 400 Hz as shown in (2) of FIG. 3, the determination of whether n-th DMT symbol belongs to the R-FEXT duration or the R-NEXT duration can be performed as follows.

It is assumed that there are 2760 samples in one cycle of the reference clock signal of 400 Hz, as shown in (1) of FIG. 3. Also, each symbol is assumed to have 256 samples during training as shown in (2) of FIG. 3. Then, a parameter S is defined as:

$$S=\{256*(n-1)\}\mod 2760.$$

If $\{(S<(a-256)\}$ or $\{S>(a+b)\}$ is satisfied, then it is judged that the n-th symbol belongs to an R-FEXT duration.

If $\{(a-256)\leq S \leq(a+b)\}$ is satisfied, then it is judged that the n-th symbol belongs to an R-NEXT duration.

From an ADSL modem in the central office, a sequence switching symbol is transmitted to inform the switching timing of the training sequence to the opposite party. If the receiving side cannot recognize the head of the sequence switching symbol, it is impossible to normally perform the training. In order to surely inform the sequence switching, the sequence switching symbol is transmitted at a time when the receiving side can receive the head of the sequence switching symbol during a FEXT duration according to an embodiment of the present invention at the receiving side.

FIG. 4 shows the timing of the sequence switching symbol informed from the central office to the remote terminal. In FIG. 4, (1) represents the reference clock signal of 400 Hz; (2) shows the C-NEXT durations and C-FEXT durations at the central office; (3) shows the head of the sequence switching symbol transmitted from the central office; (4) shows the head of the sequence switching symbol received by the remote terminal; and (5) shows the R-FEXT durations and R-NEXT durations at the remote terminal. The slashed portions in the figure represent the head of the sequence switching symbol. As shown in (3) and (4) of FIG. 4, the head of the sequence switching symbol is received during the R-FEXT duration at the remote terminal.

In the ADSL modem also, during training, a signal to noise S/N is measured for each modulating carrier in the receiving signal to determine the number of bits to be transmitted for each modulating carrier. Under the TCM cross-talk environment, the S/N measurement must be performed in each of the NEXT durations and the FEXT durations by taking the influence of the NEXT or the FEXT into account.

FIG. 5 shows how to define the NEXT duration and the FEXT duration for measuring the S/N. In FIG. 5, (1) shows the reference clock signal of 400 Hz; (2) shows the original R-FEXT duration and the original R-NEXT duration at the remote terminal when S/N is not measured; (3) shows the definition of an R-FEXT duration "a" for measuring S/N and of an R-NEXT duration "e" for measuring S/N; (4) shows DMT symbols in the FEXT duration "a"; and (5) shows DMT symbols in the R-NEXT duration "e". As shown in FIG. 5, the R-NEXT duration "a" for measuring S/N and the R-FEXT duration "e" for measuring S/N are defined within the original R-FEXT duration and the original R-NEXT duration, respectively. The number of bit calculated from S/N measured in the NEXT duration must be a value which can ensure a predetermined bit error rate (hereinafter referred to as BER). To this end, as shown in (4) of FIG. 5, only the DMT symbols within the R-FEXT duration "a" are used to measure the S/N in the R-FEXT duration; and as shown in (5) of FIG. 5, only the DMT symbols within the R-NEXT duration "e" are used to measure the S/N in the R-NEXT duration. The DMT symbols which are not included in either the R-FEXT duration "a" or R-NEXT duration "e" are not used to measure the S/N because they have no meaning as information to determine the number of bits to be transmitted.

When the first symbol of the DMT symbols is synchronized with the head of the cycle of the receiving signal of 400 Hz, the determination of whether the n-th symbol belongs to the FEXT duration for measuring S/N or the NEXT duration for measuring S/N can be performed as follows.

It is assumed that there are 2760 samples in one cycle of the reference signal of 400 Hz, as shown in (1) of FIG. 5. Also, each symbol is assumed to have 272 samples during communication, as shown in (4) of FIG. 5. Then, a parameter S is defined as:

$$S=\{272*(n-1)\}\mod 2760.$$

If $\{(S<(a-272)\}$ or $\{S>(a+d+e+f)\}$ is satisfied, then it is judged that the n-th symbol belongs to an R-FEXT duration for measuring S/N.

If $\{(a+d)<S<(a+d+e-272)\}$ is satisfied, then it is judged that the n-th symbol belongs to an R-NEXT duration for measuring S/N.

If any one of the above conditions is not satisfied, then the n-th symbol is not considered for measuring S/N.

Figure 11:
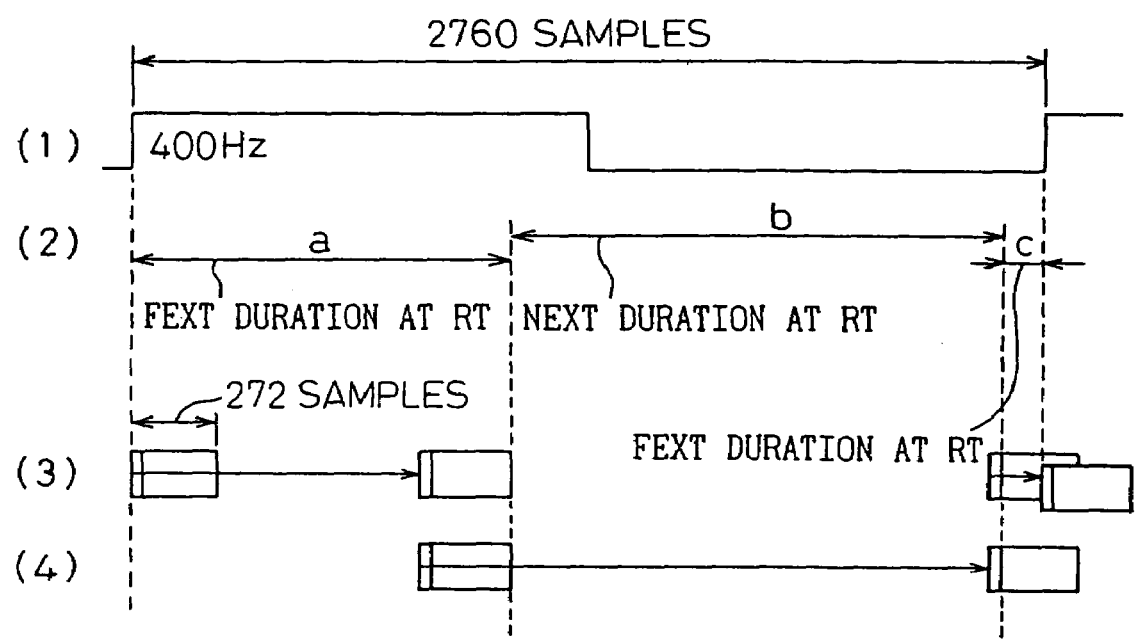
FIG. 11 is a diagram showing how to define the noise durations during communication.
Figures 13A, 13B:
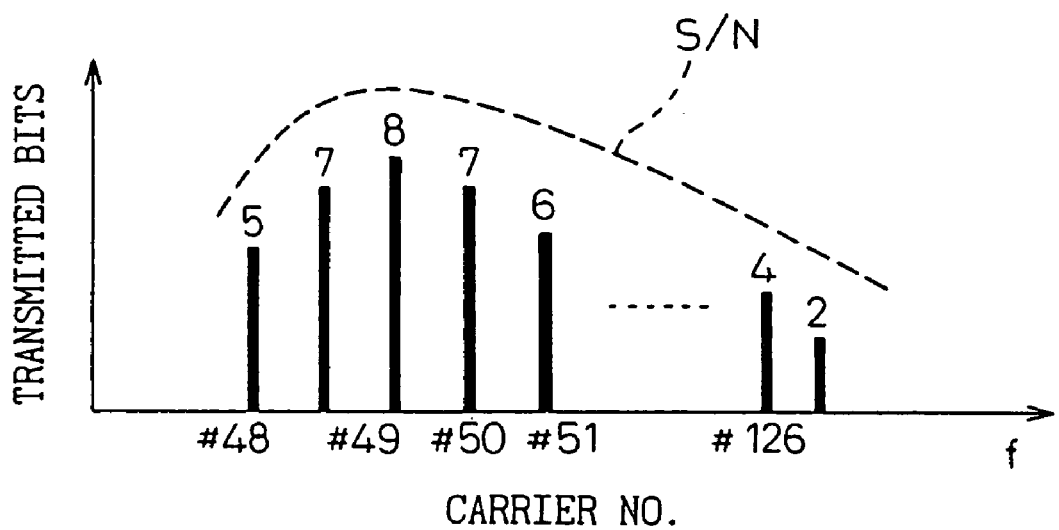
FIGS. 13A and 13B show how to define the diagram showing number of bits to be transmitted to obtain a bitmap.

If should be noted that (d+e+f) is equal to "b"in FIG. 3 or in FIG. 11.

FIG. 6 is a block diagram of an S/N measuring unit in the ADSL modem in the remote terminal.

When a demodulator 210 receives receiving data, it outputs signal points of each carrier signal as demodulated data. A reference unit 220 outputs signal points of respective carrier signals which are to be received when there is no error. The difference between a signal point from the reference unit 220 and a corresponding demodulated signal point from the demodulator 210 is an ERROR. The ERROR is input to a selector 260.

Further, a clock signal generated from a clock generator 230 in the remote terminal is divided by a frequency divider 240 into a signal having a frequency of 400 Hz. The phase of the signal of 400 Hz generated by the frequency divider 240 is synchronized with the phase of the signal of 400 Hz transmitted from the central office. The signal of 400 Hz from the frequency divider 240 is input to a phase discriminator 250. The phase discriminator 250 judges, based on the signal of 400 Hz input into the phase discriminator 250, that the received DMT symbol belongs to a FEXT duration, a NEXT duration, or other duration. The judged result is input to a selector 260. The selector 260 transfers the above-mentioned ERROR to a NEXT duration S/N measuring unit 270 or a FEXT duration S/N measuring unit 280, in accordance with the judged result from the phase discriminator 250. Each of the S/N measuring units integrates the ERRORs to calculate S/N. The S/N for each carrier signal is output to a transmitting capacity calculating unit 290. The transmitting capacity calculating unit 290 calculates the number of bits to be transmitted for each carrier signal, based on the S/N of each carrier signal, to output a bitmap b-NEXT for a NEXT duration and a bitmap b-FEXT for a FEXT duration.

The ADSL modem in the remote terminal calculates a transmitting capacity based on the b-NEXT and the b-FEXT. That is, based on the fact that the value in the b-FEXT duration is the number of bits to be transmitted which can be received during R-FEXT durations only, and the value in the b-NEXT duration is the number of bits to be transmitted which can be received in all durations, the following two values are obtained:

a transmitting capacity 1=(b–total bit number in FEXT)×α×modulation rate; and a transmitting capacity 2=(b–total bit number in NEXT)×1.0 ×modulation rate.

Then the larger transmitting capacity is selected by communication between the central office and the remote terminal.

Here the method to transmit data in all durations by using the bitmap b-NEXT is referred to as the standard method; and the method to transmit data only during R-FEXT durations is referred to as sliding window bitmap (hereinafter referred to as SWB) method.

Figure 7:
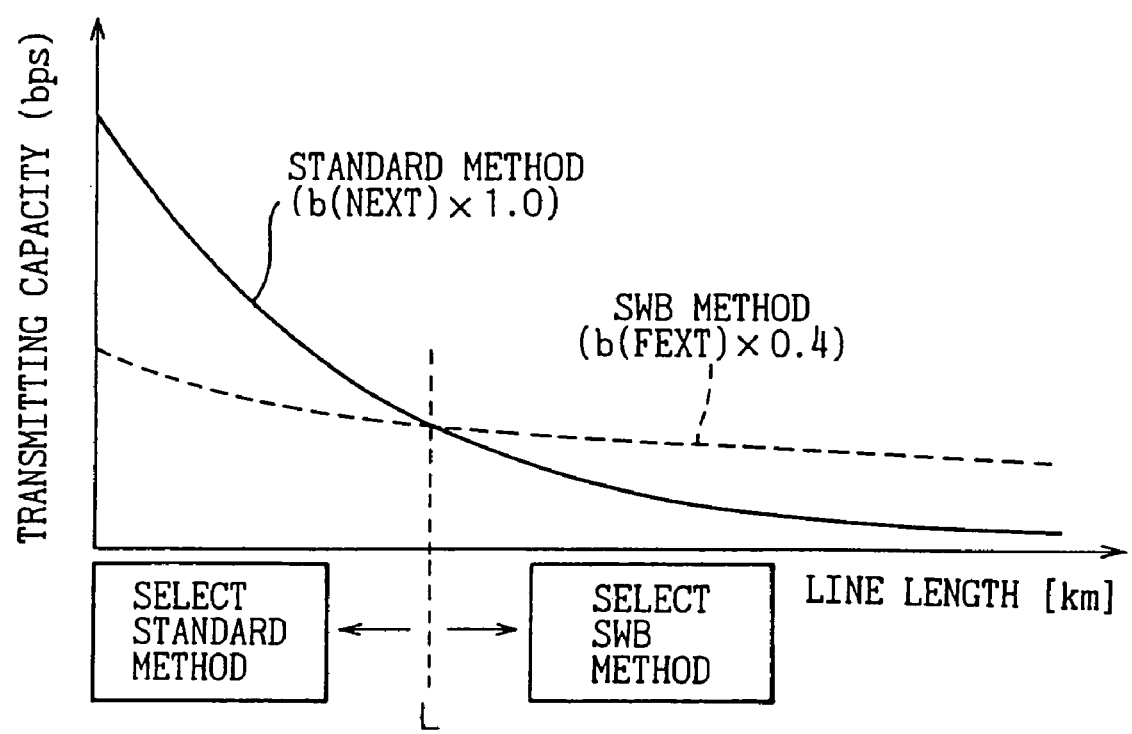
FIG. 7 is a graph showing transmitting capacities according to the standard method and the SWB method of the present invention.

FIG. 7 is a graph showing the transmitting capacity in the standard method and in the SWB method. The solid curve in the figure represent the standard method; and the dashed curve represents the SWB method. As shown in FIG. 7, under an environment where there is a TCM cross-talk, when the standard method is employed, the longer the length of the line becomes, the larger the influence of the NEXT; in contrast, when the SWB method is employed, even though the transmitting capacity is not high when the line is short, the transmitting capacity is not largely lowered even when the length of the line becomes large.

When the line length is L, the transmitting capacity according to the standard method is the same as the transmitting capacity according to the SWB method. Therefore, it is preferable to select the standard method when the line length is shorter than the length L, and to select the SWB method when the line length is longer than the length L.

Figure 8:
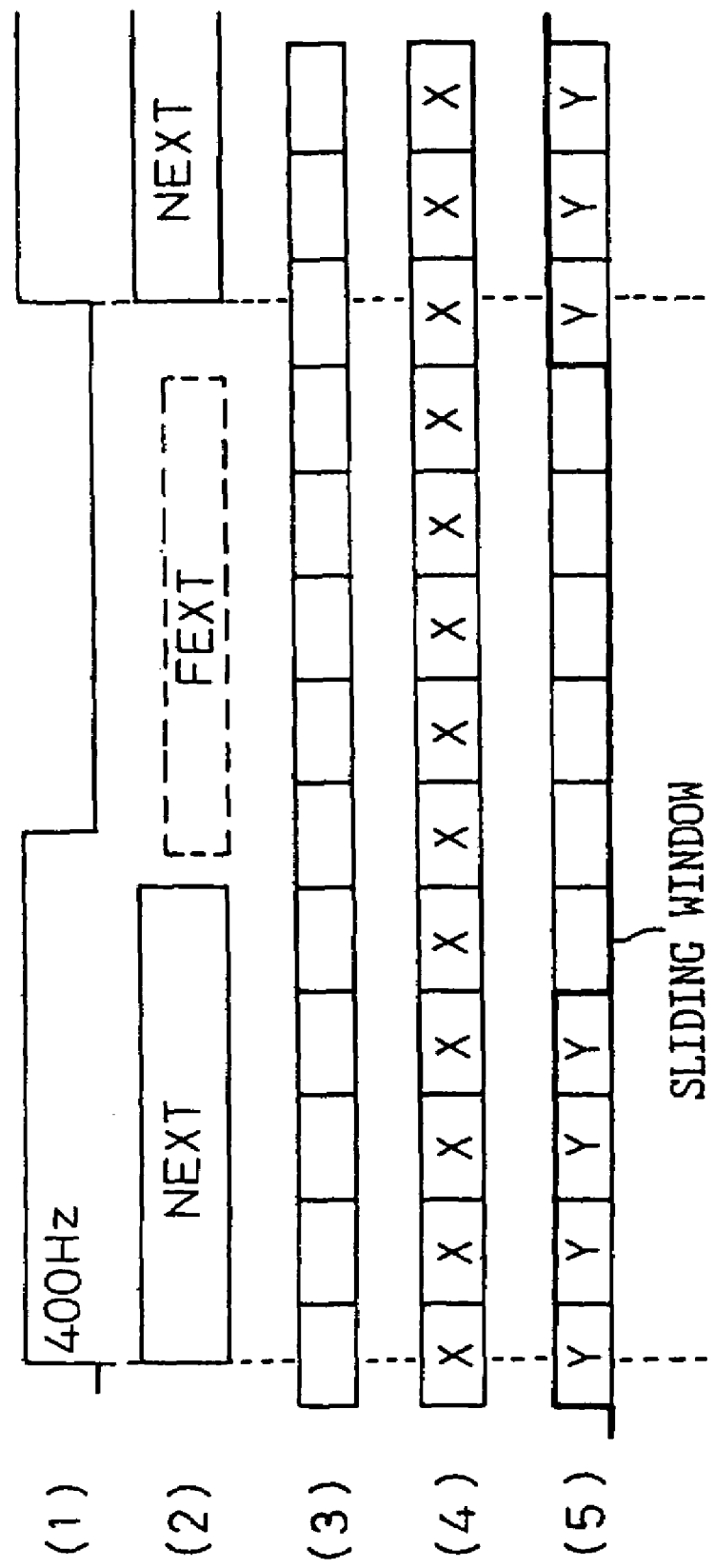
FIG. 8 is a diagram showing bitmaps according to the standard method and the SWB method.

FIG. 8 shows a transmitting DMT symbols according to the standard method and the SWB method. In FIG. 8, (1) shows the reference signal of 400 Hz; (2) shows the NEXT durations and FEXT durations at the central office; (3) shows DMT symbols transmitted from the central office according to the standard method; (4) shows DTM symbols X obtained by the b-NEXT bitmap; and (5) shows DMT symbols Y obtained by the b-FEXT bitmap.

According to the SWB method, the transmitting side slides the window so as to allocate transmitting bits to each carrier signal only when the transmitting side is in the C-NEXT durations, that is, only when the receiving side is in the R-FEXT durations, and the receiving side slides the window to demodulate the received data during the R-FEXT durations, as shown in (5) of FIG. 8.

Further, the transmitting signal of a DMT symbol outside the sliding window may be a pilot tone for a timing synchronization, and the other carrier signal may be any signal.

Figure 9:
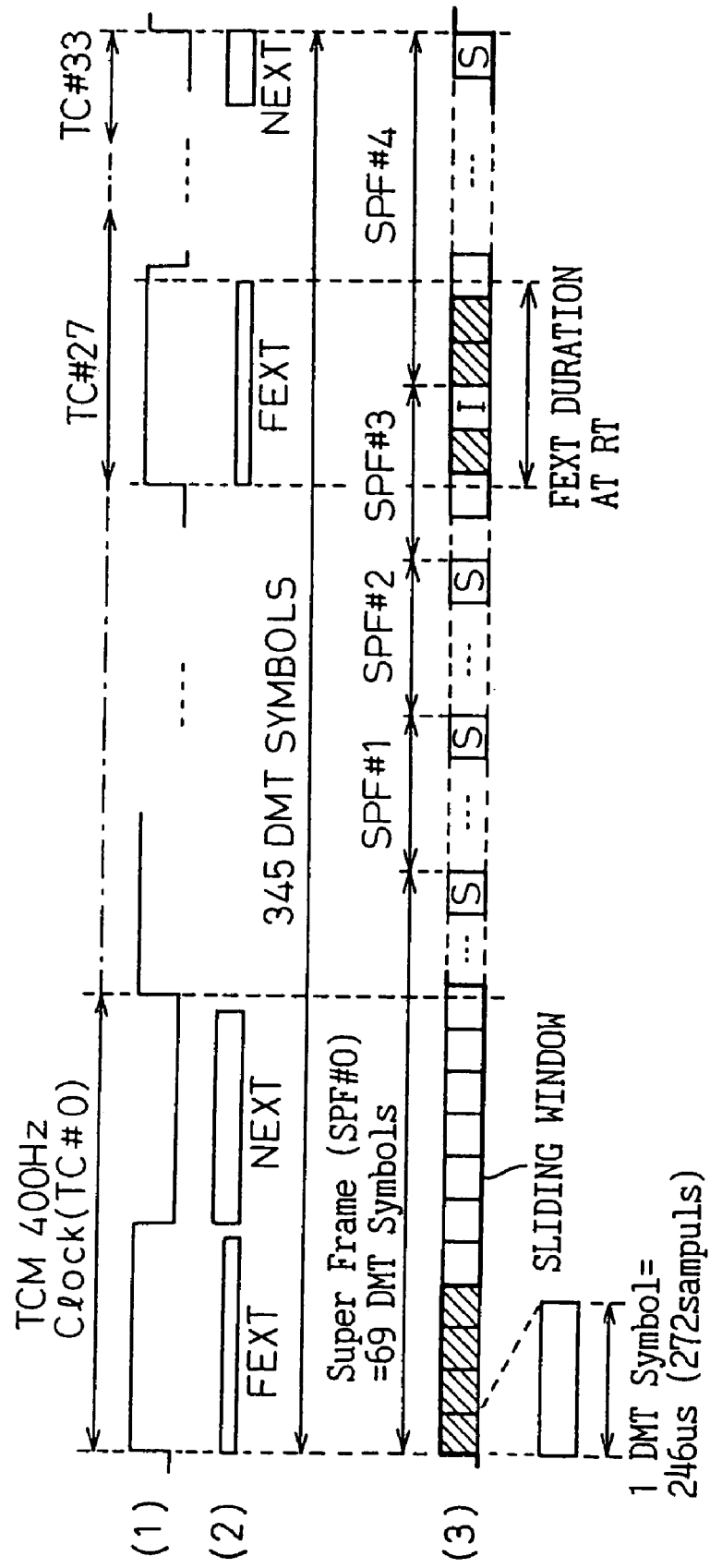
FIG. 9 is a diagram showing a transmission pattern from the central office according to the SWB method.

FIG. 9 shows a transmitting signal pattern transmitted from the central office according to the SWB method.

In FIG. 9, (1) shows the reference clock signal of 400 Hz; (2) shows the FEXT durations and the NEXT durations at the remote terminal; and (3) shows the transmitting signal pattern transmitted from the central office.

The ADSL modem in the central office generates one super frame by 69 DMT symbols. In the 69-th DMT symbol, a synchronizing symbol S indicating the boundary of the super frame is inserted. The synchronizing symbol S does not include user data. The ADSL modem transmits the above-mentioned super frames.

According to the SWB method, five super frames form a single unit. The time duration of the single unit is made to coincide with an integer multiple of the time duration (2.5 ms) of one cycle of the reference clock signal of 400 Hz shown in (1). In order to allow the remote terminal to recognize the fifth super frame as a boundary of the super frames, the fourth synchronizing symbol S is inverted in the central office to be an inverted synchronizing symbol I. Thus the signal point of the inverted synchronizing signal I is different by 180° from the signal point of the synchronizing signal S. By sending the inverted synchronizing signal I in the position of the fourth synchronizing symbol, the remote terminal can receive this inverted synchronizing signal I in an R-FEXT duration so that the remote terminal can surely establish a synchronization of its own SWB with the SWB of the central office.

Figure 10:
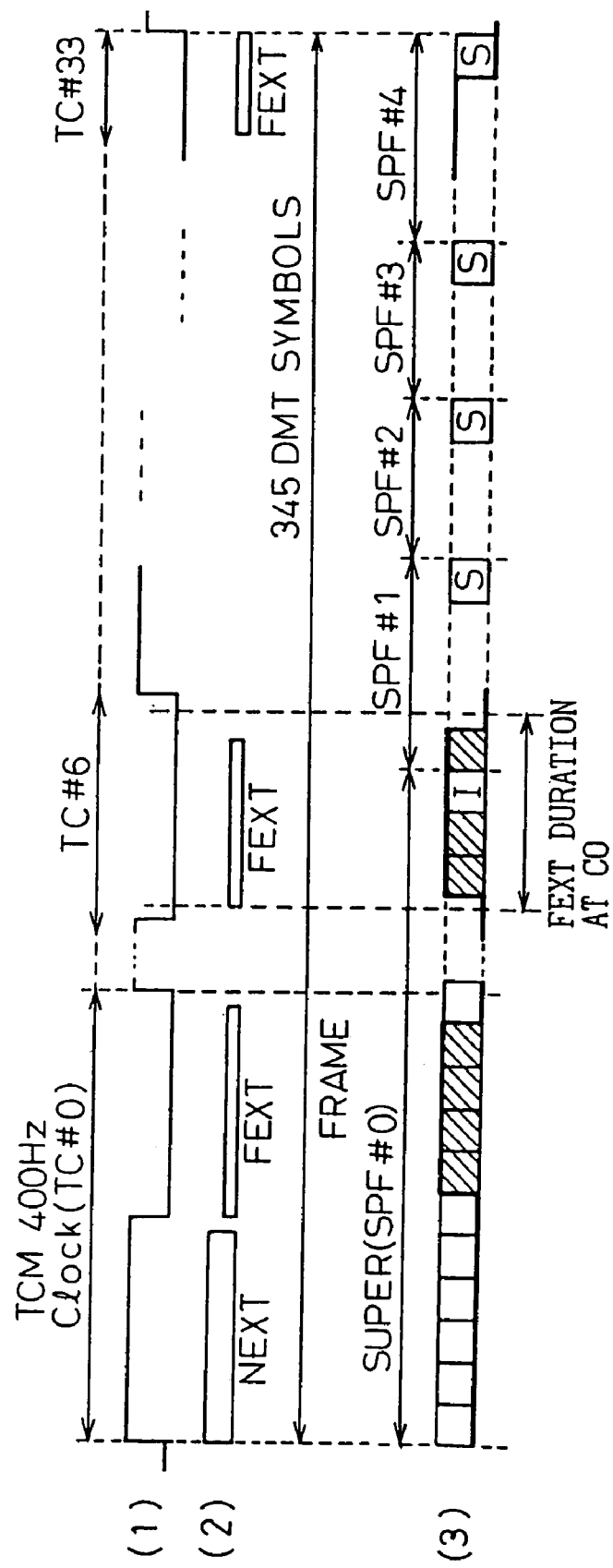
FIG. 10 is a diagram showing a transmission pattern from the remote terminal according to the SWB method.

FIG. 10 shows a transmitting signal pattern transmitted from the remote terminal according to the SWB method.

In FIG. 10, (1) shows the reference signal of 400 Hz; (2) shows the NEXT durations and the FEXT durations at the central office; and (3) shows the transmitting signal pattern transmitted from the remote terminal.

The transmitting signal pattern transmitted from the remote terminal is similar to that transmitted from the central office. That is, sliding windows are formed to allow the central office to receive signals during its FEXT durations. Similar to the central office, the remote terminal also generate a single unit consisting of five super frames. In order to allow the central office to recognize the boundary of the five super frames, the first synchronizing symbol is inverted in the remote terminal to be an inverted synchronizing symbol I. Thus the signal point of the inverted synchronizing signal I is different by 180° from the signal point of the synchronizing signal S. By sending the inverted synchronizing signal I in the position of the first synchronizing symbol, the central office can receive this inverted synchronizing signal I in a FEXT duration so that the central office can detect that the remote terminal is correctly in synchronization according to the SWB method.

FIG. 11 shows how to define the R-NEXT duration and the R-FEXT duration when a signal of 400 Hz is transmitted during data communication.

During data communication, when all of the samples in a DMT symbol other than the Cyclic Prefix are within an FEXT duration, the DMT symbol is defined as the DMT symbol in the R-FEXT duration. In the other cases, the DMT symbol is defined as a DMT symbol in an R-NEXT duration. The defined durations include the round trip delay mentioned before and a system margin.

When the first DMT symbol is synchronized with the head of one cycle of the reference signal of 400 Hz, the determination of whether n-th symbol belongs to the R-FEXT duration or the R-NEXT duration can be performed as follows.

It is assumed that there are 2760 samples in one cycle of the reference clock signal of 400 Hz, as shown in (1) of FIG. 11. Also, each symbol is assumed to have 272 samples during communication, as shown in (3) of FIG. 11. Then a parameter S is defined as:

$$S = \{272 * (n-1)\} \bmod 2760.$$

If $\{S<(a-272)\}$ or $\{S+16>(a+b)\}$ is satisfied, then it is judged that the n-th symbol belongs to a FEXT duration (B duration).

If $\{(a-272) \leqq S\}$ and $\{S+16 \leqq (a+b)\}$ are satisfied, then it is judged that the n-th symbol belongs to an R-NEXT duration (A duration).

FIG. 12 is a diagram showing a method for modified sliding window transmission system according to an embodiment of the present invention. As shown in FIG. 12, two DMT symbols X as outside of sliding window and Y as inside of sliding window according to two bitmaps are employed. The DMT symbols x according to the first bitmap is used in the R-NEXT durations. The DMT symbols Y according to the second bitmap is used in the R-FEXT durations.

What is claimed is:

1. A digital subscriber line communicating method comprising the step of:

sequentially transmitting a plurality of Super Frames, each of said Super Frames including 69 DMT symbols and one of said DMT symbols in each of said Super Frames being a Sync Symbol for defining a boundary of the Super Frame, through a telephone line, which can be affected by a near end cross-talk (NEXT) or a far end cross-talk (FEXT) from ISDN in former and latter halves of a TCM of 400 Hz, wherein continuous five of said Super Frames form one unit whose duration is made to coincide with an integer multiple of a time duration (2.5 ms) of the TCM of 400 Hz and, when the head of the first Super Frame coincides with the head of one cycle of said TCM of 400 Hz, the fourth Sync Symbol in the fourth Super Frame is inverted and transmitted to the FEXT duration of a remote terminal.

2. A digital subscriber line communicating method comprising the step of:

sequentially transmitting a plurality of Super Frames, each of said Super Frames including 69 DMT symbols and one of said DMT symbols in each of said Super Frames being a Sync Symbol for defining a boundary of the Super Frame, through a telephone line, which can be affected by a near end cross-talk (NEXT) or a far end cross-talk (FEXT) from ISDN in former and latter halves of a TCM of 400 Hz, wherein continuous five of said Super Frames form one unit whose duration is made to coincide with an integer multiple of a time duration (2.5 ms) of the TCM of 400 Hz and, when the bead of the first Super Frame coincides with the head of one cycle of said TCM of 400 Hz, the first Sync Symbol in the first Super Frame is inverted and transmitted to the FEXT duration of a central office.

3. An xDSL apparatus comprising:

a unit for sequentially transmitting a plurality of Super Frames, each of said Super Frames including 69 DMT symbols and one of said DMT symbols in each of said Super Frames being a Sync Symbol for defining a boundary of the Super Frame, through a telephone line, which can be affected by a near end cross-talk (NEXT) or a far end cross-talk (FEXT) from ISDN in former and latter halves of a TCM of 400 Hz, wherein continuous five of said Super Frames form one unit whose duration is made to coincide with an integer multiple of a time duration (2.5 ms) of the TCM of 400 Hz and, when the head of the first Super Frame coincides with the head of one cycle of said TCM of 400 Hz, the fourth Sync Symbol in the fourth Super Frame is inverted and transmitted to the FEXT duration of a remote terminal.

4. An xDSL apparatus comprising:

a unit for sequentially transmitting a plurality of Super Frames, each of said Super Frames including 69 DMT symbols and one of said DMT symbols in each of said Super Frames being a Sync Symbol for defining a boundary of the Super Frame, through a telephone line, which can be affected by a near end cross-talk (NEXT) or a far end cross-talk (FEXT) from ISDN in former and latter halves of a TCM of 400 Hz, wherein continuous five of said Super Frames form one unit whose duration is made to coincide with an integer multiple of a time duration (2.5 ms) of the TCM of 400 Hz and, when the head of the first Super Frame coincides with the head of one cycle of said TCM of 400 Hz, the first Sync Symbol in the first Super Frame is inverted and transmitted to the FEXT duration of a central office.

* * * * *